US009975065B2

(12) United States Patent
Vareika et al.

(10) Patent No.: US 9,975,065 B2
(45) Date of Patent: May 22, 2018

(54) SURFACE WASTING SYSTEM

(71) Applicant: Evoqua Water Technologies LLC, Warrendale, PA (US)

(72) Inventors: Matthew J. Vareika, Lakeville, MA (US); Steven E. Woodard, Cumberland, ME (US); Joseph P. Gwarjanski, Minot, ME (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 356 days.

(21) Appl. No.: 14/763,191

(22) PCT Filed: Mar. 14, 2013

(86) PCT No.: PCT/US2013/031196
§ 371 (c)(1),
(2) Date: Jul. 24, 2015

(87) PCT Pub. No.: WO2014/120254
PCT Pub. Date: Aug. 7, 2014

(65) Prior Publication Data
US 2015/0352466 A1 Dec. 10, 2015

Related U.S. Application Data

(60) Provisional application No. 61/757,780, filed on Jan. 29, 2013.

(51) Int. Cl.
*B01D 21/24* (2006.01)
*F16K 21/18* (2006.01)
(Continued)

(52) U.S. Cl.
CPC ..... *B01D 21/2433* (2013.01); *B01D 21/0018* (2013.01); *B01D 21/2427* (2013.01);
(Continued)

(58) Field of Classification Search
CPC ............ B01D 21/2444; B01D 21/0018; B01D 21/2427; B01D 35/05; B01D 17/0211;
(Continued)

(56) References Cited

U.S. PATENT DOCUMENTS 4,405,458 A * 9/1983 McHugh, Jr. ...... B01D 17/0214
210/242.1
6,250,347 B1 6/2001 Tatsuno
(Continued)

FOREIGN PATENT DOCUMENTS

DE 19720338 A1 11/1998
FR 2426288 A1 12/1979
JP S5556881 A 4/1980

*Primary Examiner* — Claire A Norris

(57) ABSTRACT

The present disclosure is directed to systems and methods for removing waste materials from the surface of liquid in a liquid treatment system. In one example a surface wasting system comprises a chamber including a sump, an outer conduit coupled by a first seal to an upper wall of the chamber, an inner conduit axially disposed within the outer conduit, the inner conduit in contact with a surface of a liquid in a treatment vessel of the liquid treatment system, an expandable waterproof bellows having a lower end coupled to the outer conduit above the first seal and an upper end coupled to the inner conduit, the waterproof bellows forming a second seal between the outer conduit and the inner conduit, and a float coupled to the inner conduit and configured to vertically displace the inner conduit responsive to a change in a level of liquid in the sump.

23 Claims, 9 Drawing Sheets

(51) Int. Cl.
*C02F 1/48* (2006.01)
*C02F 3/12* (2006.01)
*B01D 21/00* (2006.01)
*B01D 21/30* (2006.01)
*C02F 1/00* (2006.01)

(52) U.S. Cl.
CPC ............ *B01D 21/307* (2013.01); *C02F 1/488* (2013.01); *C02F 3/1263* (2013.01); *C02F 2001/007* (2013.01); *C02F 2305/12* (2013.01); *Y02W 10/15* (2015.05)

(58) Field of Classification Search
CPC ................. B01D 21/2433; B01D 35/26; B01D 21/0024; B01D 21/0042; B01D 21/307; B01D 21/34; E02B 15/10; C02F 1/40; C02F 1/488; C02F 3/1263; C02F 1/006; C02F 1/24; B03C 2201/18; E03F 5/14; E03F 5/16; Y10T 137/7323; Y10T 137/86252

USPC ................ 210/242.1, 540, 104, 121, 170.05; 137/398, 578; 141/198
See application file for complete search history.

(56) References Cited

U.S. PATENT DOCUMENTS

| | | | |
|---|---|---|---|
| 7,790,023 B1* | 9/2010 | Mills .................. | B01D 21/2444 210/122 |
| 2005/0189300 A1* | 9/2005 | Everett .................. | C02F 3/006 210/703 |
| 2008/0164184 A1* | 7/2008 | Marston .................. | B03C 1/03 209/219 |
| 2011/0132821 A1* | 6/2011 | Green .................. | C02F 3/109 210/150 |
| 2011/0203992 A1 | 8/2011 | Liu et al. | |

* cited by examiner

SURFACE WASTING SYSTEM

RELATED APPLICATIONS

This application claims priority under 35 U.S.C. § 119(e) to U.S. Provisional Application Ser. No. 61/757,780, titled "SURFACE WASTING SYSTEM," filed on Jan. 29, 2013 which is herein incorporated by reference in its entirety.

BACKGROUND

Some examples of wastewater treatment systems utilize biological and/or chemical reactions to remove or reduce harmful pollutants contained in the wastewater. These various biological and/or chemical processes desirably contend with multiple types of wastewater that enters the wastewater treatment system, for example, wastewater from industrial, commercial, and domestic sources. Problematic foam, grease, and other substances which are not well removed by the various biological and/or chemical processes may accumulate in the wastewater treatment system. For example, biological wastewater treatment processes often produce foam forming filamentous bacteria as a byproduct of the biological treatment process. These substances may create problems with regard to odor and appearance, and can impair settling of suspended solids in mixed liquor output from the biological treatment processes, as well as treatment efficiency.

In the past, some wastewater treatment systems have used pumps located at the lower portions of biological treatment tanks and/or at the bottom of a clarifier to waste excess biological growth from the treatment processes. These types of apparatus, however, have not been directed to removing floating materials from the various treatment vessels that may be present in a wastewater treatment system. More recently, some wastewater treatment facilities have installed surface wasting systems to remove problematic floating matter, for example, scum pipes, weirs, or skimmers. A significant disadvantage of these systems is that they remove well-settling organisms, in addition to the organisms that tend to float and cause foam. Further, these systems are typically not self adjusting and typically have inadequate flow control.

SUMMARY

In accordance with an aspect of the present disclosure there is provided a liquid treatment system including a surface wasting system. The liquid treatment system comprises a chamber including a sump, an outer conduit coupled by a first seal to an upper wall of the chamber, an inner conduit axially disposed within the outer conduit, the inner conduit in contact with a surface of a liquid in a treatment vessel of the liquid treatment system, an expandable waterproof bellows having a lower end coupled to the outer conduit above the first seal and an upper end coupled to the inner conduit, the waterproof bellows forming a second seal between the outer conduit and the inner conduit, and a float coupled to the inner conduit and configured to vertically displace the inner conduit responsive to a change in a level of liquid in the sump.

In accordance with some embodiments the system further comprises a solids-handling pump included in the chamber, the solids-handling pump configured to remove waste solids and liquid from the sump.

In accordance with some embodiments the system further comprises a gravity drain configured to remove waste solids and liquid from the sump.

In accordance with some embodiments the treatment vessel is a biological treatment vessel.

In accordance with some embodiments the chamber is coupled to one of a wall and a floor of the biological treatment vessel.

In accordance with some embodiments the surface wasting system is configured to maintain an upper end of the inner conduit at about a surface of the liquid in the biological treatment vessel.

In accordance with some embodiments the system further comprises a flotation support coupled to the chamber.

In accordance with some embodiments the flotation support maintains the chamber at a relatively constant depth below a surface of the liquid in the treatment vessel.

In accordance with some embodiments the biological treatment vessel is a sequencing batch reactor.

In accordance with some embodiments the surface wasting system is uncoupled from walls and a floor of the treatment vessel.

In accordance with some embodiments the system further comprises a solids-handling pump included in the chamber, the solids-handling pump configured to remove waste solids and liquid from the sump.

In accordance with some embodiments the system further comprises a ballast recovery system having an inlet in fluid communication with an outlet of the sump.

In accordance with some embodiments the ballast recovery system includes a magnetic separator configured to recover magnetite from waste solids collected from the surface of the liquid by the surface wasting system.

In accordance with some embodiments the ballast recovery system includes one of a mechanical separator and a magnetic separator configured to recover magnetite from waste solids collected from the surface of the liquid by the surface wasting system.

In accordance with another aspect of the present disclosure there is provided a surface waste collector. The surface waste collector comprises an outer conduit coupled by a first seal to an upper wall of a chamber including a sump, an inner conduit axially disposed within the outer conduit, an expandable waterproof bellows having a lower end coupled to the outer conduit above the first seal and an upper end coupled to the inner conduit, the waterproof bellows forming a second seal between the outer conduit and the inner conduit, and a float mechanically coupled to the inner conduit and configured to vertically displace the inner conduit relative to the outer conduit responsive to a change in a level of liquid in the sump.

In accordance with some embodiments the chamber is coupled to one of a wall and a floor of a wastewater treatment vessel.

In accordance with some embodiments the surface waste collector is configured to maintain an upper end of the inner conduit at about a surface of a liquid in a wastewater treatment vessel.

In accordance with some embodiments the surface waste collector further comprises a flotation support coupled to the chamber.

In accordance with another aspect of the present disclosure there is provided a method for the treatment of wastewater. The method comprises disposing a surface wasting system within a biological treatment vessel of a wastewater treatment system. The surface wasting system includes a chamber including a sump, an outer conduit coupled by a first seal to an upper wall of the chamber, an inner conduit axially disposed within the outer conduit, an expandable waterproof bellows having a lower end coupled to the outer conduit above the first seal and an upper end coupled to the inner conduit, the waterproof bellows forming a second seal between the outer conduit and the inner conduit, and a float coupled to the inner conduit and configured to vertically displace the inner conduit responsive to a change in a level of liquid in the sump. The method further includes removing waste solids from a surface of a liquid in the biological treatment vessel with the surface wasting system.

In accordance with some embodiments the method further comprises recovering magnetite from the waste solids.

In accordance with some embodiments recovering the magnetite comprises processing the waste solids through a magnetic separator.

In accordance with some embodiments recovering the magnetite comprises processing the waste solids through one of a mechanical separator and a magnetic separator.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
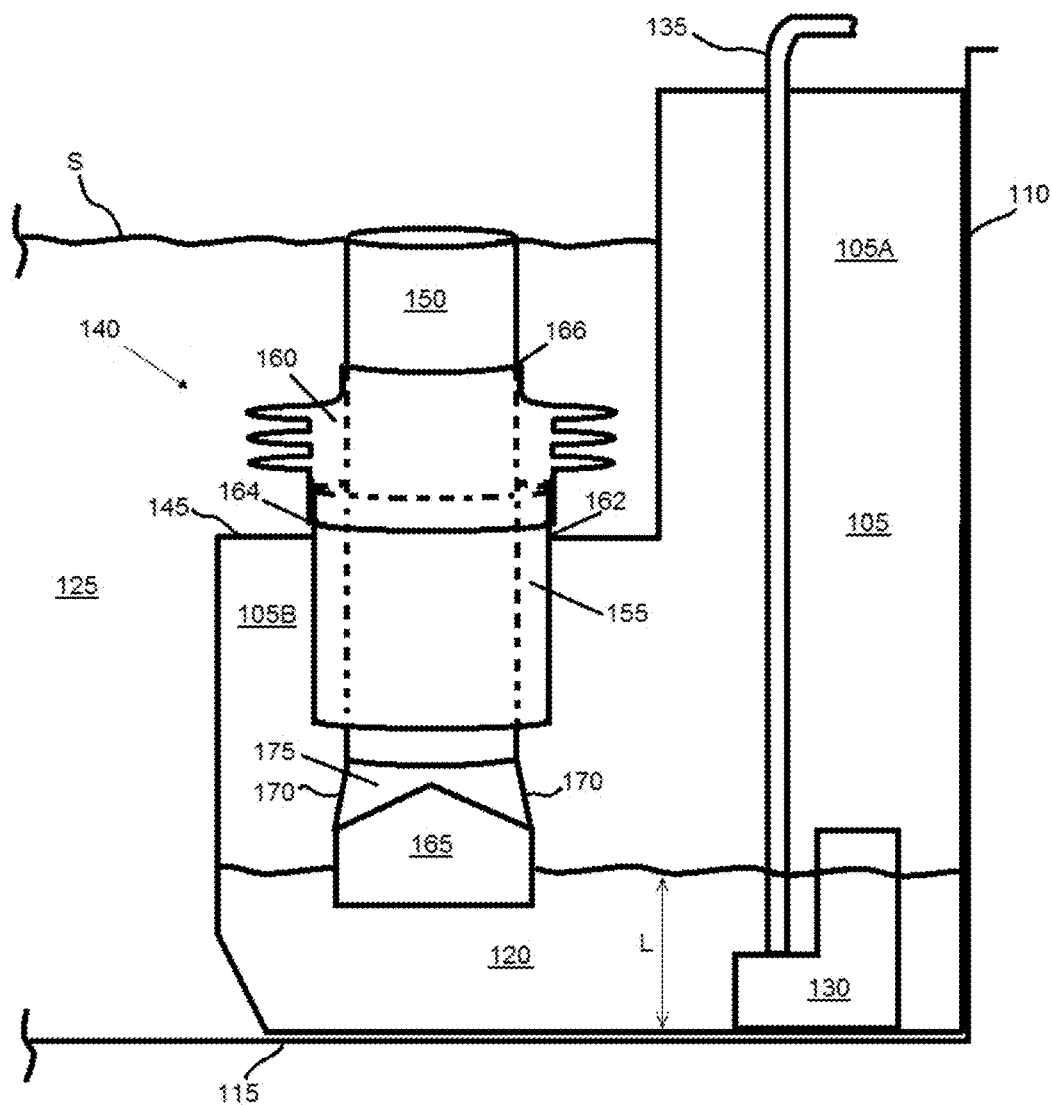
FIG. 1A is a cross sectional view of a surface wasting system in accordance with an embodiment of the present disclosure.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

Disclosed herein are aspects and embodiments of a surface wasting system for a wastewater treatment facility that has various advantages over prior art systems. Aspects and embodiments of the surface wasting systems disclosed herein selectively remove waste materials from the surface of a wastewater treatment vessel, tank or channel, and provide for self-regulating overflow wasting. Existing surface wasting systems suffer from imprecise flow control and organism selection. There is a need for a self-regulating system that removed materials only from the liquid surface. Aspects and embodiments of the surface wasting systems disclosed herein provide for more selective surface waste removal and improved foam control as compared to prior systems. More specifically, this invention "sips" only from the surface, compared to weirs and other existing "surface" wasting systems that also inadvertently waste appreciable amounts of sub-surface mixed liquor. In some embodiments the system will flow waste materials and/or liquid from a surface of liquid in a wastewater treatment vessel into a sump at the same rate that waste materials and/or liquid is being removed from the sump, for example, by a pump. The flow rate of the waste materials and/or liquid into the sump may be controlled by a float attached to a surface waste collector. Embodiments of the surface wasting system provide for a substantially continuous, controlled surface wasting rate regulated by a desired flow rate of the pump. The surface wasting system may automatically shut down when the wasting goals have been achieved and may provide for limited to no entrapment of floating matter in the sump.

Although described herein as utilized for the wasting of surface materials from treatment vessels of a wastewater treatment system, embodiments of the disclosed surface wasting system may alternatively be utilized for other purposes. For example, some embodiments of the disclosed surface wasting system may be utilized to remove oil from a surface of a liquid, for example, water contaminated with oil due to, for example, an oil spill from an oil transporting vessel or due to leakage of oil from an undersea oil well.

In one embodiment, indicated generally at 100 in FIG. 1A, a surface wasting system includes an L-shaped chamber 105. The chamber 105 is secured to a wall 110 of a treatment vessel, for example, an aerobic biological treatment tank of a wastewater treatment facility. In other embodiments, the chamber 105 may be secured to a floor 115 of the treatment vessel. The highest side 105A of the chamber 105 is open to atmosphere. The lower side 105B of the chamber 105 is enclosed. The lower side 105B of the chamber 105 includes a sump 120 to which liquid and/or waste materials from the surface S of liquid 125 in the treatment vessel are delivered. A solids-handling pump 130 capable of pumping liquid and solids having a diameter of, for example, up to about two inches, is present in the sump 120. The solids handling pump is configured to discharge waste material and liquid from the sump 120 through a waste conduit 135 for downstream processing or disposal.

A surface waste collector, indicated generally at 140, includes an outer conduit 155, for example, a pipe, mechanically coupled to an upper wall 145 of the lower side 105B of the chamber 105. The outer conduit 155 is coupled to the upper wall 145 with a seal 162, for example, a watertight seal, so that liquid 125 may not pass into the chamber 105 from around the outer conduit 155. The seal 162 between the outer conduit 155 and the upper wall 145 may be formed by a gasket, O-ring, adhesive and/or any other sealing mechanism known in the art. An inner conduit 150, for example, a pipe, of the surface waste collector 140 is axially disposed within the outer conduit 155 of the surface waste collector 140. In some embodiments, the inner conduit 150 is coaxially disposed within the outer conduit 155. An expandable waterproof bellows 160 forms a seal, for example, a watertight seal, between the inner conduit 150 and the outer conduit 155. The bellows 160 includes a lower end coupled with a seal 164, for example, a watertight seal, to the outer conduit 155 above the seal 162 between the outer conduit 155 and the upper wall 145 of the chamber 105 and an upper end coupled with a seal 166, for example, a watertight seal, to the inner conduit 150. In some embodiments, the bellows 160 is coupled to the inner and/or outer conduits 150, 155 by an adhesive and in other embodiments with one or more clamps and/or other sealing mechanisms known in the art. The bellows 160 may be formed of a resilient material, for example, rubber, and may include one or more pleats to facilitate expansion or contraction of the bellows in a vertical direction.

An open upper end of the inner conduit 150 extends above an open upper end of the outer conduit 155. An open lower end of the inner conduit 150 extends below an open lower end of the outer conduit 155. In some embodiments the diameter of the inner conduit 150 and the diameter of the outer conduit 155 are selected so the inner conduit 150 can travel freely inside the outer conduit 155 without binding. In some embodiments wear strips may be provided on the inner conduit 150 to protect it from abrasion. The inner conduit 150 is free to move vertically relative to the outer conduit 155 with the height of the inner conduit 150 being controlled by an internal float 165. The internal float 165 may be lightweight and rigid and may have a density less than that of water so that it floats in liquid in the sump 120. The internal float 165 may be formed from a hollow body of a plastic material, for example, polyethylene or high density polyethylene, or may comprise a polymeric foam. Aspects and embodiments disclosed herein are not limited to any particular materials of construction of the internal float 165. The internal float 165 is connected to the inner conduit 150 by, for example, one or more rods 170. The one or more rods 170 provide an open area 175 between the bottom of the inner conduit 150 and the inside of the chamber 105 through which waste materials and liquid collected from the surface S of the liquid 125 in the treatment vessel may flow.

Figure 1B:
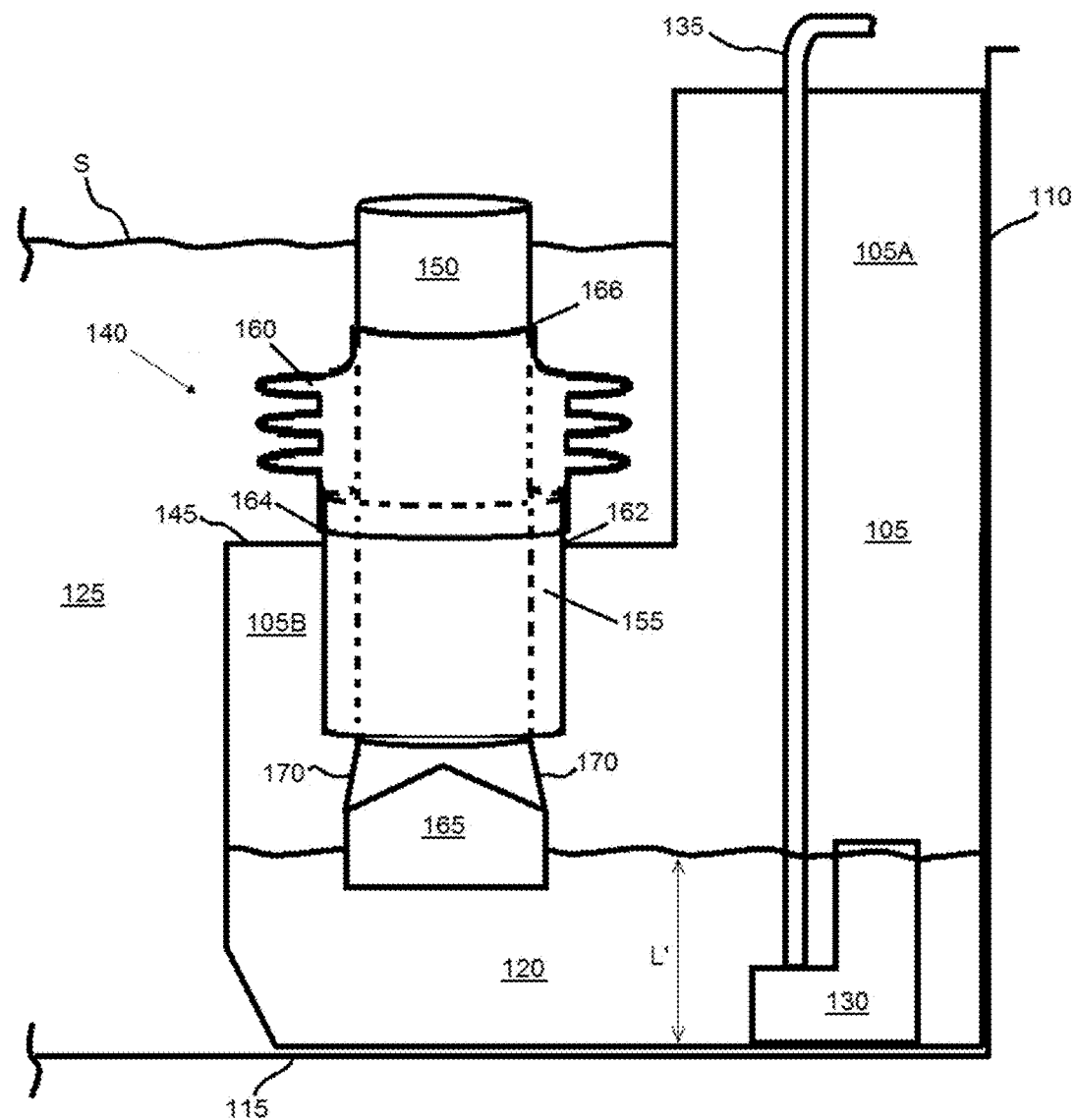
FIG. 1B is the surface wasting system of FIG. 1A in an overflow state.

The internal float 165 controls the vertical position of the inner conduit 150 of the surface waste collector 140, thus regulating the overflow rate of liquid from the outside surface S of the liquid 125 into the treatment vessel. The internal float 165 causes the inner conduit 150 to telescope upward and downward through the outer conduit 155 responsive to the level of liquid in the sump 120. As the liquid level in the sump 120 increases, the float 165, and the inner conduit 150 connected thereto rises and the bellows 160 expands to facilitate the rising of the inner conduit 150. As the liquid level L in the sump 120 decreases, the float 165, and the inner conduit 150 connected thereto lowers and the bellows 160 contracts to facilitate the lowering of the inner conduit 150. If the rate of removal of liquid and/or waste materials from the sump 120 does not match or exceed the rate of introduction of liquid and/or waste materials through the surface waste collector 140 into the sump 120, the liquid level in the sump will rise to a level L' and the upper end of the inner conduit 150 will rise above the surface S of the liquid 125 in the treatment vessel, as illustrated in FIG. 1B. Further flow of liquid and waste material into the sump 120 will be suspended while the upper end of the inner conduit 150 is above the surface S of the liquid 125. If the rate of removal of liquid and/or waste material from the sump 120 is less than the rate of introduction of liquid and/or waste material through the surface waste collector 140 into the sump 120, the inner conduit 150 will sink below the surface S of the liquid 125 in the treatment vessel, increasing the flow of liquid and/or waste materials into the sump 120. In this manner, the float 165 maintains the upper end of the inner conduit 150 at or just below the surface of the liquid 125.

The surface wasting system 100 is thus self regulating with the rate of overflow of surface liquid and/or waste materials into the sump 120 controlled to match the flow of liquid and/or waste materials out of the sump 120, for example, under the influence of the pump 130. The surface wasting system provides for surface wasting at a set rate without overflowing or drying the pump chamber.

Figure 2A:
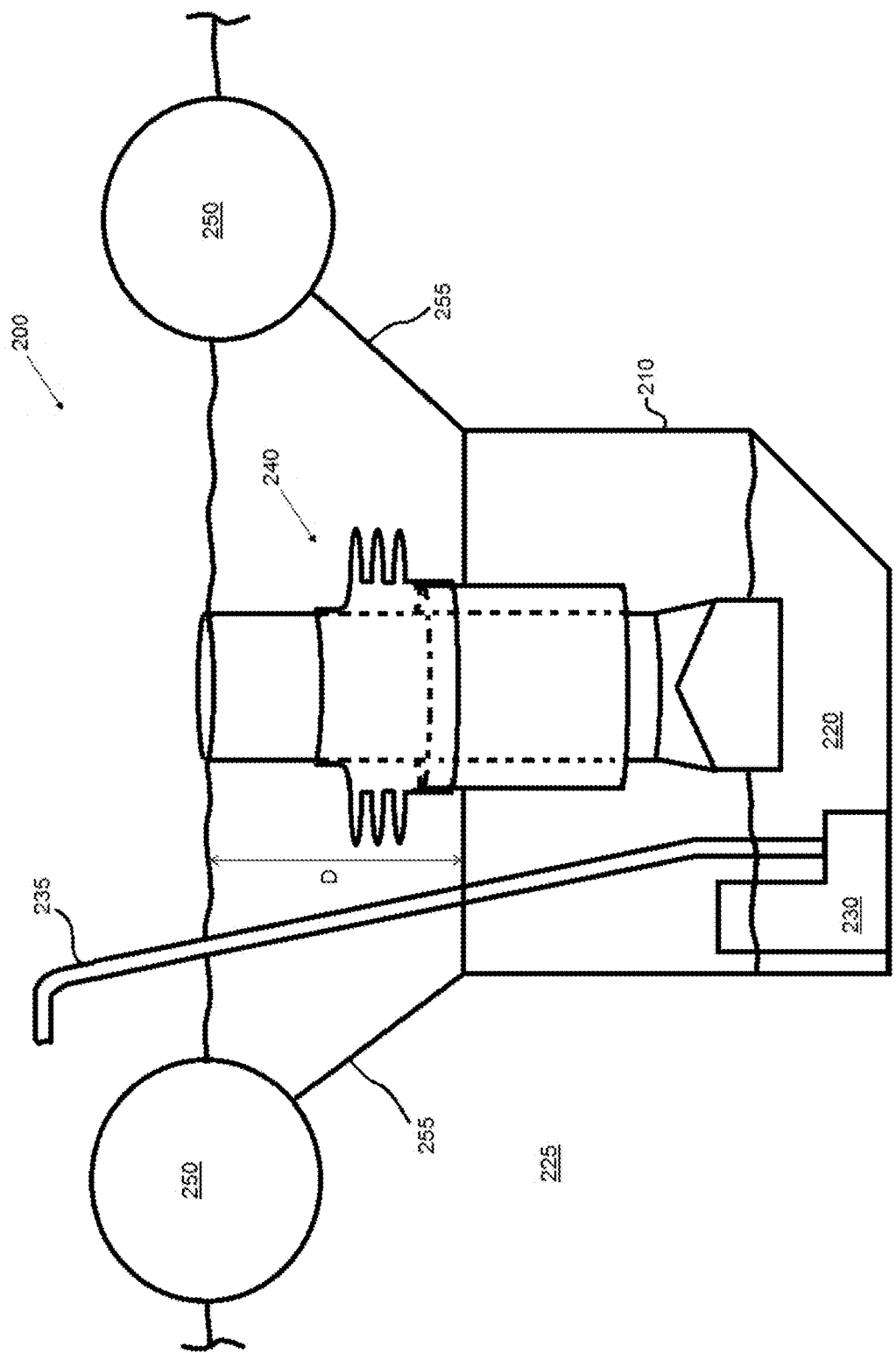
FIG. 2A is a cross sectional view of a surface wasting system in accordance with an embodiment of the present disclosure.
Figure 2B:
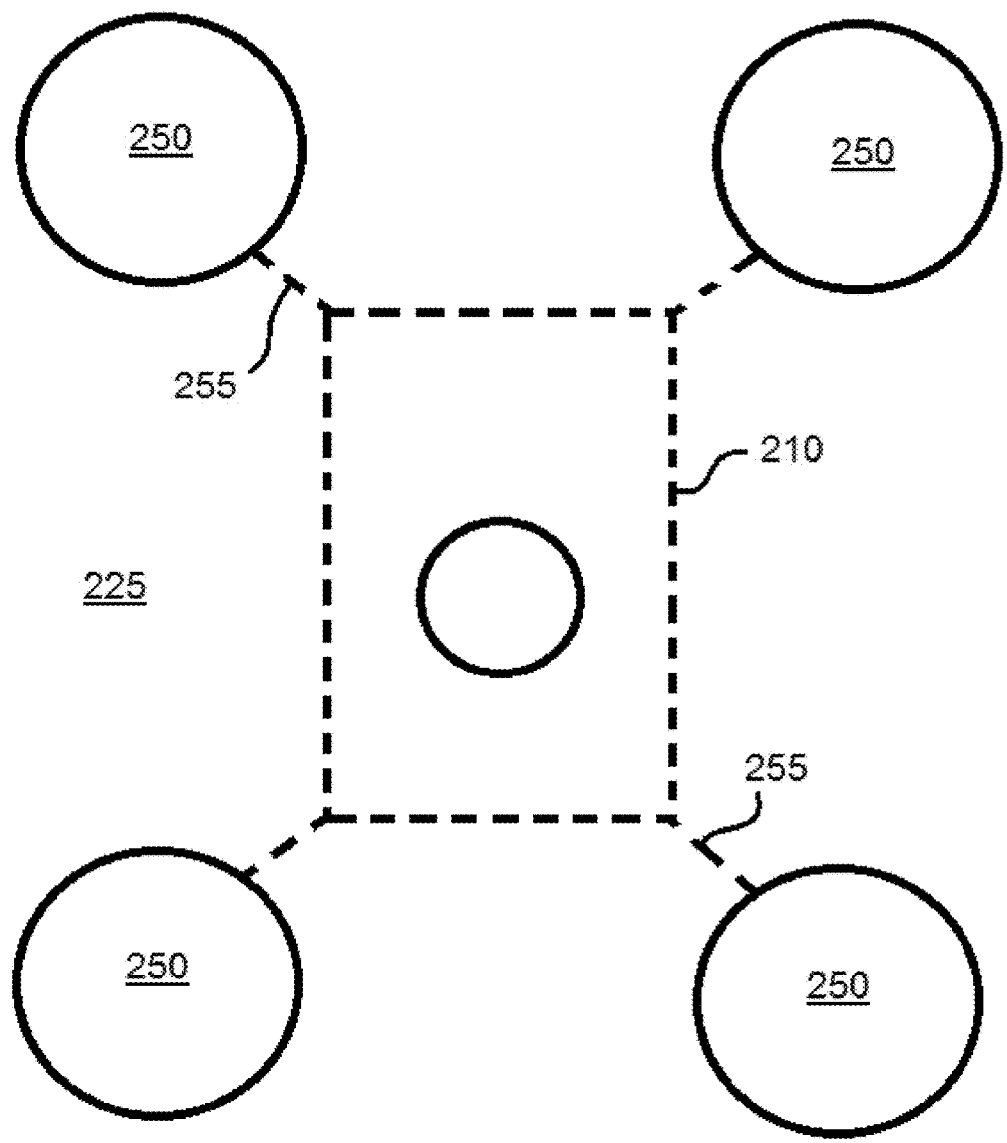
FIG. 2B is a plan view of the surface wasting system of FIG. 2A.

In another embodiment, indicated generally at 200 in FIG. 2A, a surface wasting system including a surface waste collector 240, which may be similar to the surface waste collector 140 of FIG. 1, coupled by the outer conduit of the surface waste collector to an upper wall of a submerged scum box 210. The outer conduit of the surface waste collector is coupled with a watertight seal to the upper wall of the submerged scum box 210. The submerged scum box 210 defines a chamber including a sump 220 and solids handling pump 230. The solids handling pump 230 may be similar to the solids handling pump 130 of FIG. 1, and is configured to discharge liquid and/or waste materials from the sump 220 through a waste conduit 235 for downstream processing or disposal. The solids handling pump 230 may be powered by, for example, an electrical line or a pneumatic line (not shown) routed into the interior of the submerged scum box 210. The surface wasting system 200 is free floating and free from mechanical coupling to the walls or floor of a treatment vessel in which it is disposed. The submerged scum box 210 is maintained at a relatively constant depth D below a surface of liquid 225 in the treatment vessel in which it is disposed by one or more flotation supports 250. The flotation supports 250 may be coupled to the submerged scum box 210 by one or more rods 255. The flotation supports 250 may be lightweight and rigid and may have a density less than that of water so that they float in liquid in the treatment vessel. The flotation supports 250 may be formed from hollow bodies of a plastic material, for example, polyethylene of high density polyethylene, or may comprise a polymeric foam. Aspects and embodiments disclosed herein are not limited to any particular form or materials of construction of the flotation supports 250. In some embodiments, the surface wasting system 200 is supported by a single flotation support 250, and in other embodiments, by three or four flotation supports, as is illustrated in FIG. 2B, which is a top-down view of the surface wasting system 200 in the liquid 225 of a treatment vessel. The waste conduit 235 is omitted from FIG. 2B for clarity. The surface wasting system 200 may be provided in treatment vessels of a wastewater treatment system, for example, a biological treatment vessel, and in some embodiments may be especially useful in sequencing batch reactors or multi-level reaction tanks where a level of liquid in the vessel may vary significantly over time.

Figure 3:
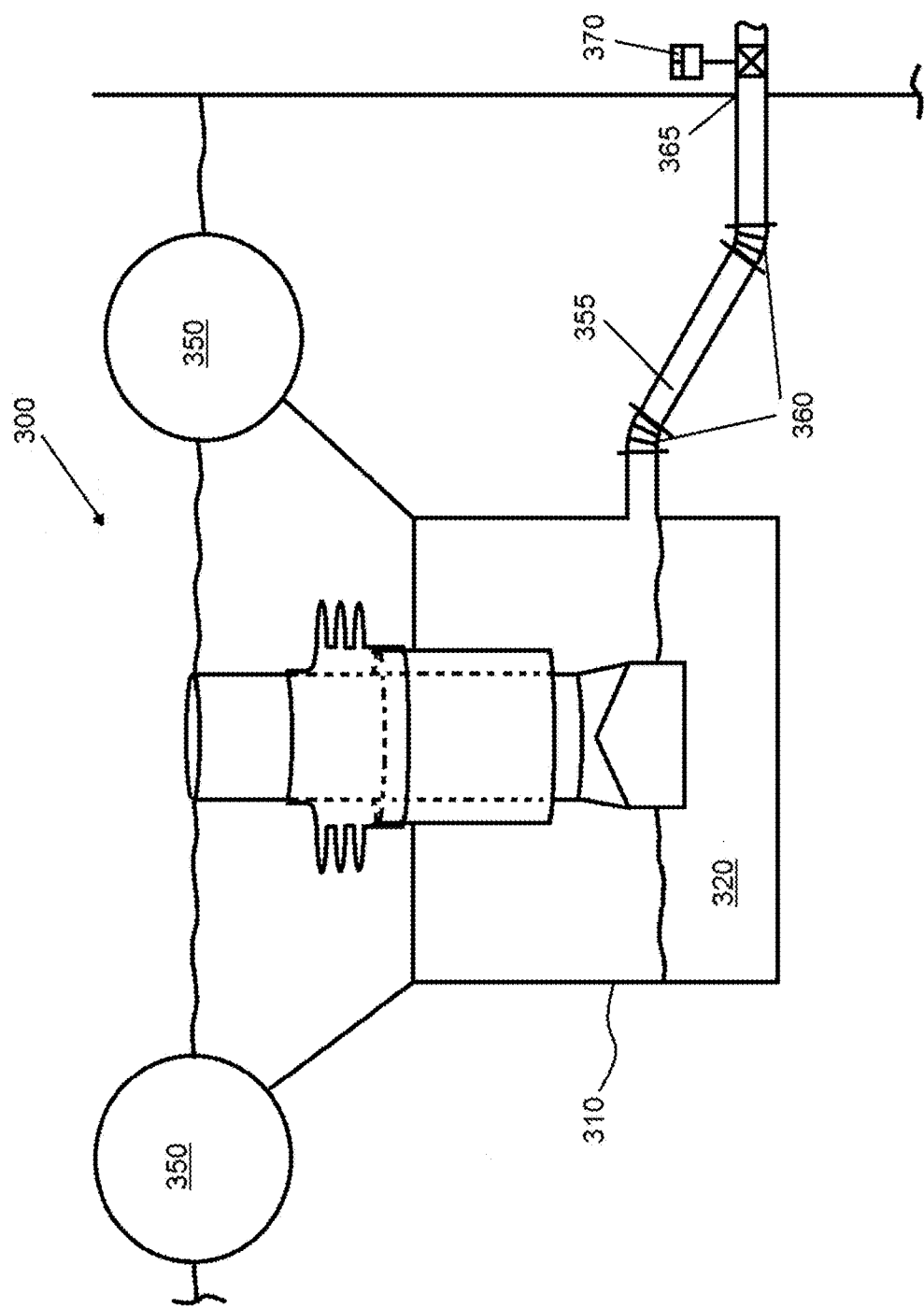
FIG. 3 is a cross sectional view of a surface wasting system in accordance with an embodiment of the present disclosure.

Another embodiment a surface wasting system is illustrated in FIG. 3, generally at 300. The embodiment of FIG. 3 also includes a submerged scum box 310 defining a chamber including a sump 320. The submerged scum box 310 is supported by one or more flotation supports 350, and may be advantageously used in wastewater treatment vessels, for example, sequencing batch reactors, where a level of liquid in the vessel may vary significantly over time. The surface wasting system 300 of FIG. 3 may be substantially similar to the surface wasting system 200 of FIG. 2, except that in the surface wasting system 300, there is no pump internal to the scum box 310. Rather, liquid and/or waste materials which are collected in the sump 320 of the scum box 310 exit through a gravity drain waste conduit 355 through a wall of the vessel in which the surface wasting system 300 is disposed. The gravity drain waste conduit 355 may be formed of a flexible material, for example, rubber and/or may include one or more bellows 360 to facilitate bending of the gravity drain waste conduit 355 as changes in the liquid level in the vessel cause the surface wasting system 300 to rise or fall relative to the outlet 365 in the wall of the vessel. A control valve 370 and/or a pump external to the vessel (not shown) may be utilized to control the flow rate of liquid and/or waste materials out of the sump 320 of the scum box 310.

In some wastewater treatment systems ballast material, for example, magnetite is added to one or more vessels, for example, biological treatment vessels, sequencing batch reactors, and/or clarifiers to facilitate settling of suspended solids in a settling tank or clarifier. A portion of the added magnetite may become trapped in foam or other floating waste material in one or more of these treatment vessels. In some instances it may be economically beneficial to recover the magnetite from liquid and/or waste materials that are removed from the surface of a treatment vessel by a surface wasting system as disclosed herein. Thus, in some embodiments, an outlet of the sump of a surface wasting system may be in fluid communication with an inlet of a ballast recovery system. For example, the waste conduit of a surface wasting system may direct collected liquid and/or waste materials to an inlet of a magnetite recovery system.

Figure 4:
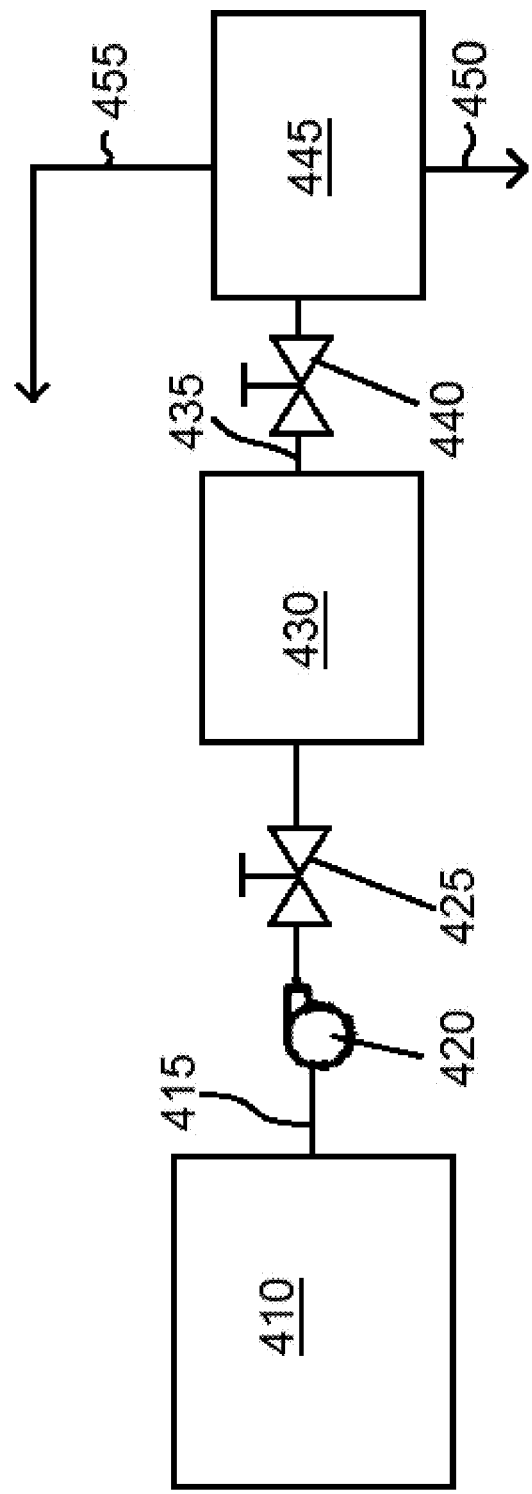
FIG. 4 is a schematic diagram a ballast recovery system in accordance with an embodiment of the present disclosure.

As illustrated schematically in FIG. 4, liquid and/or waste materials collected from the surface of a treatment vessel by a surface wasting system 410, for example, any of surface wasting systems 100, 200, or 300, is introduced into a waste conduit 415, for example, any of waste conduits 135, 235, or 355. The liquid and/or waste materials pass through the waste conduit 415 and optionally through a pump 420 and/or valve 425, which may be a flow control valve, and into a separator 430. The separator 430 performs an initial separation of magnetite particles from waste materials, for example, biological floc, using, for example, mechanical forces.

The separator 430 may include any known apparatus for separating ballast from waste solids. In one example, the separator is configured as a shear mill as illustrated generally at 500 in FIG. 5. The shear mill 500 shears the waste materials from waste conduit 415 to separate the ballast from other solids in the waste stream. The shear mill 500 may includes a rotor 505 and stator 510. In operation, the waste materials from the waste conduit 415 enter the shear mill 500 and flow in the direction of arrows 515 and enter the rotor 505 and then the stator 510. The shear mill 500 is designed such that there is a close tolerance between the rotor 505 and the stator 510. The rotor 505 is in some embodiments driven at high rotational speeds, for example, greater than about 1,000 rpm to form a mixture of ballast and substantially ballast free obliterated flocs of waste material in area 525 (FIG. 5) of the shear mill 500. The mixture of ballast and obliterated flocs exits the shear mill 500 through conduit 435, as shown by arrows 535.

Figure 5:
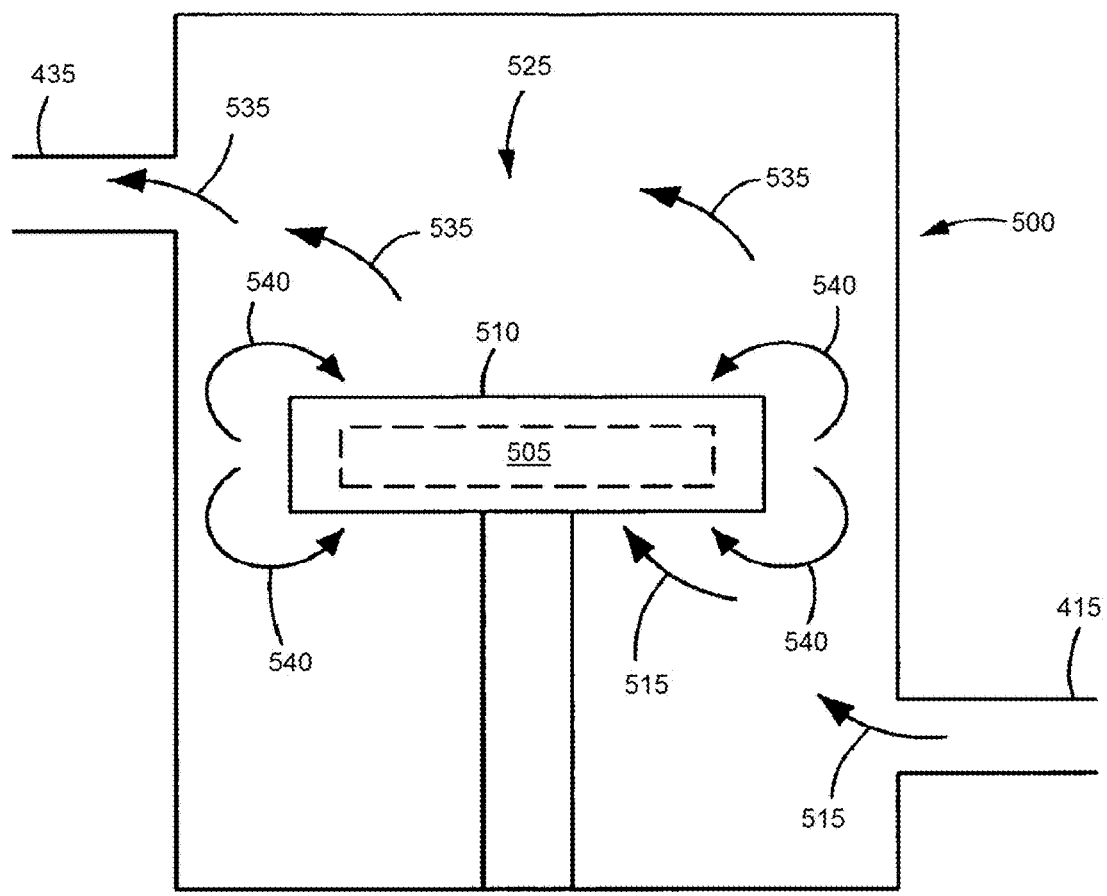
FIG. 5 is a schematic diagram of a shear mill in accordance with an embodiment of the present disclosure.

In some embodiments the rotor 505 and/or stator 510 include slots which function as a centrifugal pump to draw the waste solids from above and below rotor 505 and stator 510, as shown by paths 540 in FIG. 5. The rotor and stator then hurl the materials off the slot tips at a very high speed to break the waste solids into a mixture of ballast and obliterated flocs of waste material. For example, the rotor 505 may include slots, and the stator 510 may include slots. The slots in the rotor 505 and/or the slots in the stator 510 may be designed to increase shear energy to efficiently separate the ballast from the ballast-containing waste material. The shear developed by the rotor 505 and stator 510 may depend on the width of the slots in the rotor and/or stator, the tolerance between the rotor 505 and stator 510, and the rotor tip speed. The result is that the shear mill 500 provides a shearing effect which effectively and efficiently separates the ballast from the ballasted waste material to facilitate recovery of the ballast.

In other embodiments, the separator 430 may be configured as an ultrasonic separator or a centripetal separator, as disclosed in co-pending U.S. patent application Ser. No. 13/627,776, "BALLASTED ANAEROBIC SYSTEM AND METHOD FOR TREATING WASTEWATER" which is incorporated by reference herein in its entirety for all purposes. Aspects and embodiments disclosed herein are not limited to any particular form of separator for separating ballast from waste solids.

Figure 6A:
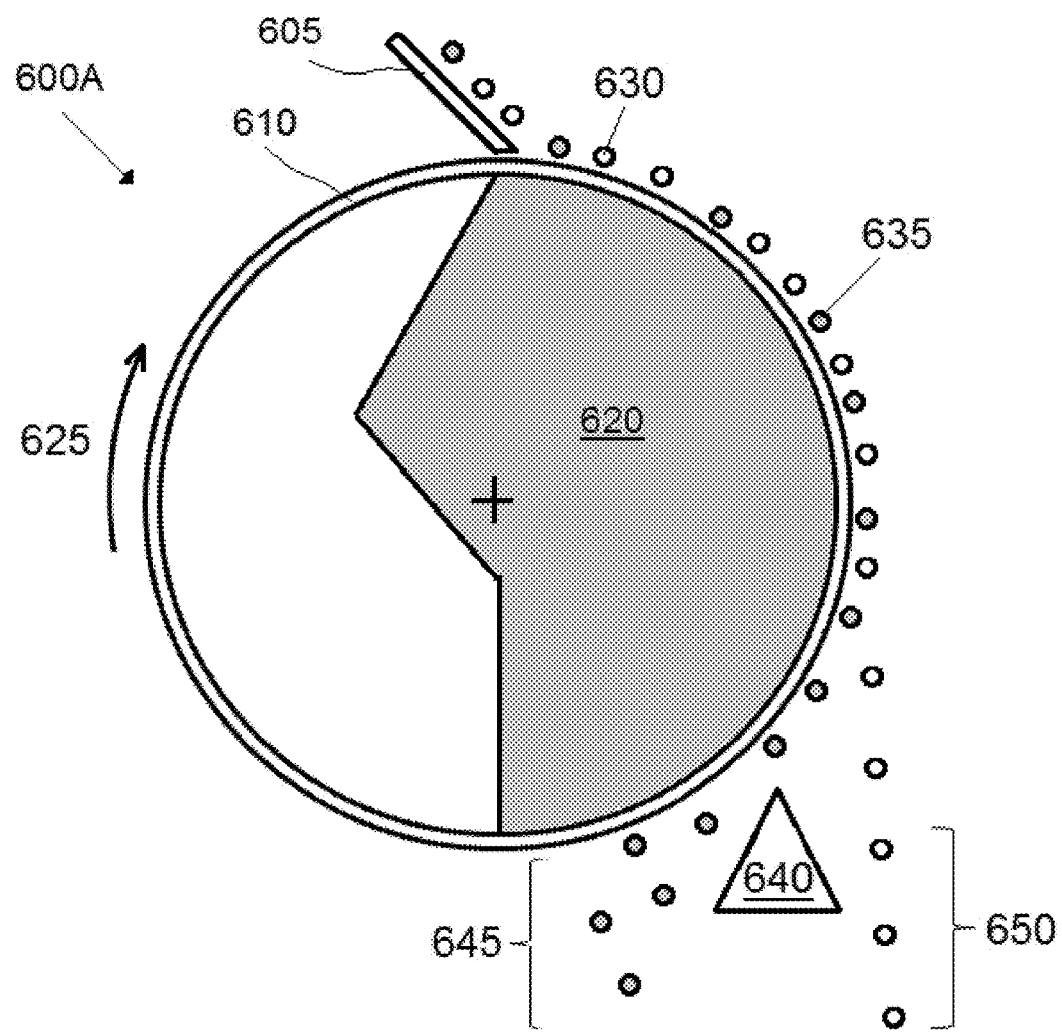
FIG. 6A is a schematic diagram of a magnetic separator in accordance with an embodiment of the present disclosure.

In some embodiments, the mixture of ballast and sheared flocs of waste material exit the shear mill 500 through a conduit 435, and optionally pass through a valve 445, which may be a flow control and/or one-way valve, and enter a magnetic drum separator, indicated generally at 600A in FIG. 6A. The magnetic drum separator 600A includes a drum 610 in which is disposed a magnet 620. The drum rotates in the direction of arrow 625, clockwise in this example. A mixture of ballast 635, represented by the colored circles in FIG. 6A, and obliterated flocs of waste material 630, represented by the empty circles in FIG. 6A, are introduced to the surface of the rotating drum 610 through a conduit or feed ramp 605. The ballast, when comprised of a magnetic material, for example, magnetite, adheres more strongly to the drum 610 than the obliterated flocs of waste material due to the presence of the magnet 620. The obliterated flocs of waste material fall off of the drum, in some examples aided by centripetal force generated by the rotating drum, before the ballast. A division vane 640 may separate the ballast 635 and obliterated flocs of waste material 630 into two separate output streams 645, and 650, respectively.

Figure 6B:
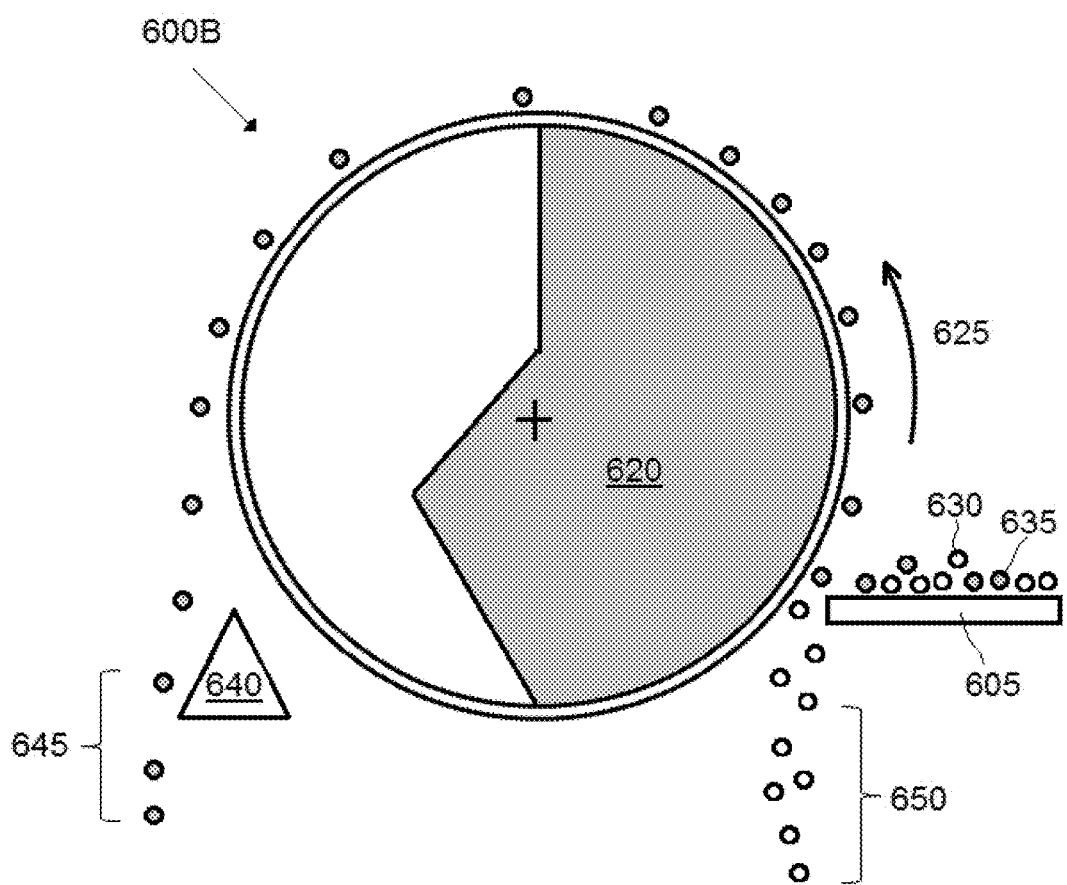
FIG. 6B is a schematic diagram of a magnetic separator in accordance with an embodiment of the present disclosure.

In another embodiment of the magnetic separator, indicated generally at 600B in FIG. 6B, the mixture of ballast and obliterated flocs of waste material is introduced by a conduit or feed ramp 605 to a position proximate and to the side of the rotating drum 610. The ballast, when comprised of a magnetic material, for example, magnetite, adheres to the rotating drum 610 due to the presence of the magnet 620 and may be removed from the rotating drum on the opposite side from the conduit or feed ramp 605 by, for example, a scraper or division vane 640. The obliterated flocs of waste material do not adhere to the rotating drum 610 and instead drop from the end of the conduit or feed ramp 605. The result is the production of separate streams 645 and 650 of the ballast 635 and obliterated flocs of waste material 630.

The ballast separated in the magnetic separator may be introduced to conduit 455 (FIG. 4) and recycled or reintroduced into one or more treatment vessels of the wastewater treatment system. The obliterated flocs of waste material may be introduced to conduit 450 and sent on for further downstream processing or disposal.

In another embodiment the mixture of ballast and flocs are introduced directly to the magnetic separator, without passing through a mechanical separation device. In other embodiments, materials collected by the surface wasting system 410 are not directed into a ballast recovery system, but rather are sent directly to a disposal system.

Embodiments of the surface wasting apparatus are not limited to the embodiments illustrated herein. Many designs of a self-adjusting weir or other components that controls the overflow rate and thus the removal of surface contaminants in a wastewater treatment system including both mechanical and electrical controlled systems may be utilized.

In further embodiments, a wastewater treatment facility may be retrofitted with any one or more of the surface wasting systems disclosed herein.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A liquid treatment system including a surface wasting system comprising:
   a chamber including a sump;
   an outer conduit coupled by a first seal to an upper wall of the chamber;
   an inner conduit axially disposed within the outer conduit;
   an expandable waterproof bellows having a lower end coupled to the outer conduit above the first seal and an upper end coupled to the inner conduit, the waterproof bellows forming a second seal between the outer conduit and the inner conduit;
   a float coupled to the inner conduit and configured to vertically displace the inner conduit responsive to a change in a level of liquid in the sump; and
   a solids-handling pump configured to remove waste solids and liquid from the sump, the float configured to cause an upper end of the inner conduit to rise above a surface of a liquid in a treatment vessel of the liquid treatment system in which the surface waste collector is disposed and suspend flow of waste solids and liquid into the sump responsive to the solids-handling pump removing waste solids and liquid from the sump at a rate less than a rate of introduction of waste solids and liquid into the sump.

2. The system of claim 1, wherein the solids-handling pump is included in the chamber.

3. The system of claim 1, further including a gravity drain configured to remove waste solids and liquid from the sump.

4. The system of claim 1, wherein the treatment vessel is a biological treatment vessel.

5. The system of claim 4, wherein the chamber is coupled to one of a wall and a floor of the biological treatment vessel.

6. The system of claim 4, wherein the surface wasting system is configured to maintain an upper end of the inner conduit at about a surface of the liquid in the biological treatment vessel responsive to the solids-handling pump removing waste solids and liquid from the sump at a rate greater than or equal to a rate of introduction of waste solids and liquid into the sump.

7. The system of claim 4, further comprising a flotation support coupled to the chamber.

8. The system of claim 7, wherein the flotation support maintains the chamber at a relatively constant depth below a surface of the liquid in the treatment vessel responsive to the solids-handling pump removing waste solids and liquid from the sump at a rate greater than or equal to a rate of introduction of waste solids and liquid into the sump.

9. The system of claim 8, wherein the biological treatment vessel is a sequencing batch reactor.

10. The system of claim 8, wherein the surface wasting system is uncoupled from walls and a floor of the treatment vessel.

11. The system of claim 8, wherein the solids-handling pump is included in the chamber.

12. The system of claim 1, further including a ballast recovery system having an inlet in fluid communication with an outlet of the sump.

13. The system of claim 12, wherein the ballast recovery system includes a magnetic separator configured to recover magnetite from waste solids collected from the surface of the liquid by the surface wasting system.

14. The system of claim 12, wherein the ballast recovery system includes one of a mechanical separator and a magnetic separator configured to recover magnetite from waste solids collected from the surface of the liquid by the surface wasting system.

15. A surface waste collector comprising:
   an outer conduit coupled by a first seal to an upper wall of a chamber including a sump;
   an inner conduit axially disposed within the outer conduit;
   an expandable waterproof bellows having a lower end coupled to the outer conduit above the first seal and an upper end coupled to the inner conduit, the waterproof bellows forming a second seal between the outer conduit and the inner conduit;
   a float mechanically coupled to the inner conduit and configured to vertically displace the inner conduit relative to the outer conduit responsive to a change in a level of liquid in the sump; and
   a solids-handling pump configured to remove waste solids and liquid from the sump, the float configured to cause an upper end of the inner conduit to rise above a surface of liquid in a vessel in which the surface waste collector is disposed and suspend flow of waste solids and liquid into the sump responsive to the solids-handling pump removing waste solids and liquid from the sump at a rate less than a rate of introduction of waste solids and liquid into the sump.

16. The surface waste collector of claim 15, wherein the chamber is coupled to one of a wall and a floor of a wastewater treatment vessel.

17. The surface waste collector of claim 15, configured to maintain an upper end of the inner conduit at about a surface of a liquid in a wastewater treatment vessel responsive to the solids-handling pump removing waste solids and liquid from the sump at a rate greater than or equal to a rate of introduction of waste solids and liquid into the sump.

18. The surface waste collector of claim 15, further comprising a flotation support coupled to the chamber.

19. A method for the treatment of wastewater comprising:
disposing a surface wasting system within a biological treatment vessel of a wastewater treatment system, the surface wasting system including:
- a chamber including a sump;
- an outer conduit coupled by a first seal to an upper wall of the chamber;
- an inner conduit axially disposed within the outer conduit;
- an expandable waterproof bellows having a lower end coupled to the outer conduit above the first seal and an upper end coupled to the inner conduit, the waterproof bellows forming a second seal between the outer conduit and the inner conduit;
- a float coupled to the inner conduit and configured to vertically displace the inner conduit responsive to a change in a level of liquid in the sump; and
- a solids-handling pump configured to remove waste solids and liquid from the sump, the float configured to cause an upper end of the inner conduit to rise above a surface of liquid in the treatment vessel and suspend flow of waste solids and liquid into the sump responsive to the solids-handling pump removing waste solids and liquid from the sump at a rate less than a rate of introduction of waste solids and liquid into the sump; and removing waste solids from a surface of a liquid in the biological treatment vessel with the surface wasting system.

20. The method of claim 19, further comprising recovering magnetite from the waste solids.

21. The method of claim 20, wherein recovering the magnetite comprises processing the waste solids through a magnetic separator.

22. The method of claim 20, wherein recovering the magnetite comprises processing the waste solids through one of a mechanical separator and a magnetic separator.

23. The system of claim 1, wherein the float is connected to the inner conduit beneath a bottom of the inner conduit by one or more rods, the one or more rods providing an open area between the bottom of the inner conduit and an inside of the chamber.

* * * * *